(12) United States Patent
Alderson et al.

(10) Patent No.: US 7,873,425 B2
(45) Date of Patent: Jan. 18, 2011

(54) SYSTEM AND METHOD OF PROCESSING COMPRESSED AUDIO DATA

(75) Inventors: Jeffrey D. Alderson, Austin, TX (US); William W. Hong, Austin, TX (US)

(73) Assignee: SigmaTel, Inc., Austin, TX (US)

( * ) Notice: Subject to any disclaimer, the term of this patent is extended or adjusted under 35 U.S.C. 154(b) by 1199 days.

(21) Appl. No.: 11/500,632

(22) Filed: Aug. 7, 2006

(65) Prior Publication Data

US 2008/0031284 A1 Feb. 7, 2008

(51) Int. Cl.
*G06F 17/00* (2006.01)
(52) U.S. Cl. ...................................................... 700/94
(58) Field of Classification Search ................... 700/94
See application file for complete search history.

(56) References Cited

U.S. PATENT DOCUMENTS

| | | | | |
|---|---|---|---|---|
| 5,243,650 | A * | 9/1993 | Roth et al. | 380/237 |
| 5,532,762 | A * | 7/1996 | Sakai et al. | 348/738 |
| 6,281,813 | B1 | 8/2001 | Vierthaler et al. | |
| 6,492,913 | B2 | 12/2002 | Vierthaler et al. | |
| 2005/0235195 | A1* | 10/2005 | Choi et al. | 714/800 |
| 2009/0080464 | A1* | 3/2009 | Wei et al. | 370/514 |

OTHER PUBLICATIONS

Hosgood, Steven BSc, Ph.D, "All You Ever Wanted to Know About NICAM but were Afraid to Ask," NICAM 728 Digital TV Sound, http://tallyho.bc.nu/~steve/nicam.html, 1995, 1996, 1997, pp. 1-13.
SGS-Thomson Microelectronics, TDA8204B NICAM Decoder, www.DatasheetCatalog.com, Nov. 1994, pp. 1-12.
Micronas, "MSP 44x8G-C4 Multistandard Sound Processor Family," Mar. 29, 2004, pp. 1-92.
ITT Intermetall, "MSP 3410 B Multistandard Sound Processor," Nov. 20, 1995, pp. 1-68.
Micronas, "MSP 3400D, MSP 3410D Multistandard Sound Processors," May 14, 1999, pp. 1-83.
Micronas, "MSP 34x1G Multistandard Sound Processor Family with Virtual Dolby Surround," May 27, 2003, pp. 1-108.
Philips, "SAA7283 Terrestrial Digital Sound Decoder (TDSD3)," Oct 24, 1996, pp. 1-36.
Philips, "TDA9810 Multistandard VIF-PLL with QSS-IF and AM demodulator," May 7, 1999, pp. 1-33.
AMTEL Quasi-split Sound Circuit and AM Demodulator IC, U4468B, www.atmel.com/literature, Rev. 4777B-TVVCR-07/05, (12 pgs), Jul. 2005.

* cited by examiner

*Primary Examiner*—Andrew C Flanders
(74) *Attorney, Agent, or Firm*—Toler Law Group

(57) ABSTRACT

A system and method of synchronizing to a frame sequence in an input signal includes tolerating data errors within certain error thresholds. In an embodiment, a Hamming distance between data included in a frame alignment word field and an expected value is compared to a predetermined Hamming distance to determine a synchronization event.

24 Claims, 8 Drawing Sheets

| Expected FAW (602) | Detected Data (604) | Hamming Distance (606) |
|---|---|---|
| 01001110 | 01001110 | 0 |
| 01001110 | 11001110 | 1 |
| 01001110 | 00001110 | 1 |
| 01001110 | 01101110 | 1 |
| 01001110 | 01011110 | 1 |
| 01001110 | 01000110 | 1 |
| 01001110 | 01001010 | 1 |
| 01001110 | 01001100 | 1 |
| 01001110 | 01001111 | 1 |
| 01001110 | 11001110 | 1 |

| 802 ↓<br>Expected FAW | 804 ↓<br>Detected Data | 806 ↓<br>Hamming Distance |
|---|---|---|
| 01001110 | 01001110 | 0 |
| 01001110 | 11111110 | 3 |
| 01001110 | 01001110 | 0 |
| 01001110 | 01001110 | 0 |
| 01001110 | 01001110 | 0 |
| 01001110 | 01001110 | 0 |
| 01001110 | 01000000 | 3 |
| 01001110 | 01001110 | 0 |
| 01001110 | 01001110 | 0 |
| 01001110 | 01001110 | 0 |

| Expected CW Data Pattern $C_0C_1C_2C_3C_4$ | Detected Data | Hamming Distance |
|---|---|---|
| X1X01 | 00100 | 2 |
| X1X01 | 11101 | 0 |
| X1X01 | 11001 | 0 |
| X1X01 | 11001 | 0 |
| X0X01 | 11101 | 0 |
| X1X01 | 11101 | 0 |
| X1X01 | 11101 | 0 |
| X1X01 | 11001 | 0 |
| X1X01 | 11001 | 0 |
| X1X01 | 01001 | 0 |

SYSTEM AND METHOD OF PROCESSING COMPRESSED AUDIO DATA

FIELD OF THE DISCLOSURE

The present disclosure is generally related to systems and methods of synchronization to an input data stream, and in particular to systems and methods of processing compressed audio data.

BACKGROUND

In Europe, television broadcast systems utilize a technique for transmitting audio signals, which may be referred to as a near instantaneous companded audio multiplex (NICAM) system. In general, an original sound sample of 14 bits is companded digitally to 10 bits for transmission. A NICAM decoder uses approximately 1 mSec of sound data to lock to an audio frame sequence.

In general, the NICAM system utilizes a high frequency subcarrier (5.85 MHz or 6.522 MHz, depending on the system), which is digitally modulated with a 728 Kbits/sec data stream. The data stream consists of a sequence of 728 bit NICAM packets transmitted continuously (one packet per millisecond). Each NICAM packet includes an 8-bit frame alignment word (FAW) followed by 5 bits of control information, followed by 11 bits of additional data, and a payload packet of 704 data bits. Three of the control bits are mode bits that define how the NICAM decoder should process the data bits of the payload packet. Another control bit identifies to the decoder if the frequency modulated (FM) television audio may be utilized as a fallback if the NICAM signal fails. The first control bit toggles between a logic high level and a logic low level to allow identification of odd and even packets. The first control bit toggles high for eight packets and then low for eight packets.

Since the FAW is just a sequence of bits and since nothing prevents the bit pattern of a FAW from appearing within the payload data, the detection process typically requires identifying a FAW, determining if the identified FAW is a real FAW (as opposed to a data pattern resembling a FAW within the payload), and then locking to the frame sequence using the FAW. Typically, a decoder detects a possible FAW and the first control bit after the FAW (referred to as the C0 bit), and then monitors each subsequent frame to determine whether the possible FAW repeats and to determine when the first control bit changes. Within 8 frames, the first control bit should transition from logic high to logic low or from logic low to logic high.

If a FAW is correctly identified, when the first control bit changes, the detector begins counting the frames to determine a lock. The first control bit should change every eight frames, so the FAW should remain unchanged for the eight frames, or the detector may restart the process. However, it may be difficult, with bit errors, to detect the FAW and the first control bit for up to 16 consecutive frames. Since NICAM transmissions may experience noise, the detection and locking process may require multiple iterations to lock to the frame sequence, even if the noise creates only a minor error in the FAW, such as only a single bit error in each FAW. When a system generating digital sound from the NICAM signal loses synchronization due to noise, a lengthy re-acquisition of synchronization will delay the return to digital sound.

Therefore, there is an on-going need for a detector to efficiently detect a frame sequence and to synchronize to the frame sequence in the presence of a noisy NICAM signal. Furthermore, there is also an on-going need for a detector to maintain synchronization in the presence of a noisy NICAM signal.

BRIEF DESCRIPTION OF THE DRAWINGS

The present disclosure may be better understood, and its numerous features and advantages made apparent to those skilled in the art by referencing the accompanying drawings.

DETAILED DESCRIPTION OF THE DRAWINGS

A method of processing compressed audio data is disclosed. The method includes receiving a compressed audio data signal communicated using a plurality of frames, where each of the plurality of frames has a frame alignment word (FAW) field. The method also includes determining a synchronization event indicating a synchronization with the plurality of frames of the received compressed audio data signal when each frame of a predetermined number of sequential frames of the plurality of frames that is received has a FAW field that includes data that is within a predetermined Hamming distance from a predetermined expected value, but not when the data exceeds the predetermined Hamming distance from the predetermined expected value.

A frame sequence synchronization module is disclosed. The frame sequence synchronization module includes a shift register to receive an input data stream comprising a plurality of frames. Each of the plurality of frames has a frame alignment word (FAW) field. The frame sequence synchronization module further includes detection logic coupled to the shift register to synchronize and maintain synchronization to the plurality of frames of the input data stream when a first frame of the plurality of frames that is received has a first FAW field that includes data that matches a predetermined expected FAW and when each frame received after the first frame of the plurality of frames has a FAW field that includes data that does not exactly match the predetermined expected FAW, and where each frame received after the first frame of the plurality of frames has a FAW field that includes data that is a Hamming distance of not more than two from the predetermined expected FAW.

A frame sequence detector is disclosed. The frame sequence detector includes an input to receive an input data stream including a plurality of frames. Each of the plurality of frames has a control word field and frame alignment word field. The frame sequence detector also includes a processor and a memory device accessible to the processor. The memory device includes logic to determine a synchronization event in response to an error characteristic of the data included in the control word field of a predetermined number of sequentially received frames.

Figure 1:
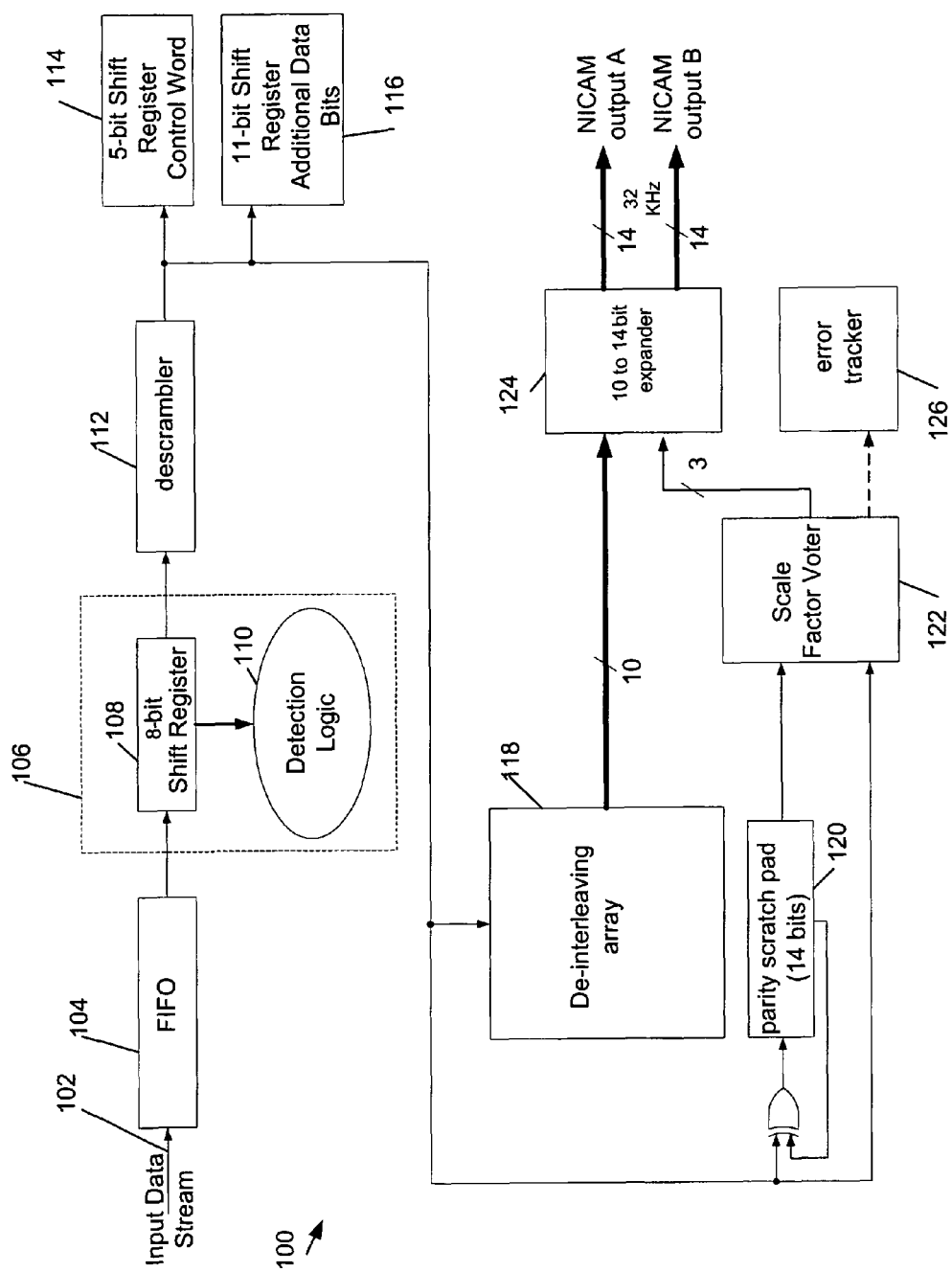
FIG. 1 is a block diagram depicting an exemplary system including a frame sequence synchronization module.

Referring to FIG. 1, a system that includes a frame sequence synchronization module is shown. The system 100 includes a first-in-first-out (FIFO) buffer 104 responsive to an input data stream 102. The system 100 also includes a frame sequence synchronization module 106 and a descrambler 112. The system 100 further includes a 5-bit control word shift register 114, an 11-bit additional data shift register 116, a de-interleaving array 118 and a 10 bit to 14 bit expander 124. The system 100 also includes a data path output from the descrambler 112, which includes exclusive-or (XOR) logic coupled to a parity scratch pad 120, a scale factor voter module 122, and an error tracker module 126. The 10 bit to 14 bit expander 124 is coupled to an output of the scale factor voter 122, and the expander 124 provides a first near instantaneous companded audio multiplex (NICAM) output A and a second NICAM output B.

The frame sequence synchronization module 106 includes an 8 bit shift register 108 and includes detection logic 110.

During operation, the input data stream 102 is received and stored at the FIFO buffer 104 and then passed to the shift register 108 within the frame sequence synchronization module 106. The input data stream 102, once stored in the shift register 108, is then processed by the frame synchronization detection logic 110. The frame sequence synchronization module 106, upon detecting synchronization to a frame sequence in the input data stream 102 then provides the synchronized data to descrambler 112 for further processing and storage within the shift registers 114 and 116. The output therefrom is provided to the de-interleaving array 118 and in parallel to the parity scratch pad 120 dependant on the XOR logic input thereto. Output from the de-interleaving array 118 is provided to the expander 124. Similarly, an output from the parity scratch pad is provided via the scale factor voter module 122 to a second input of the expander 124. The expander 124 then provides the dual outputs NICAM output A and NICAM output B as shown.

Figure 2:
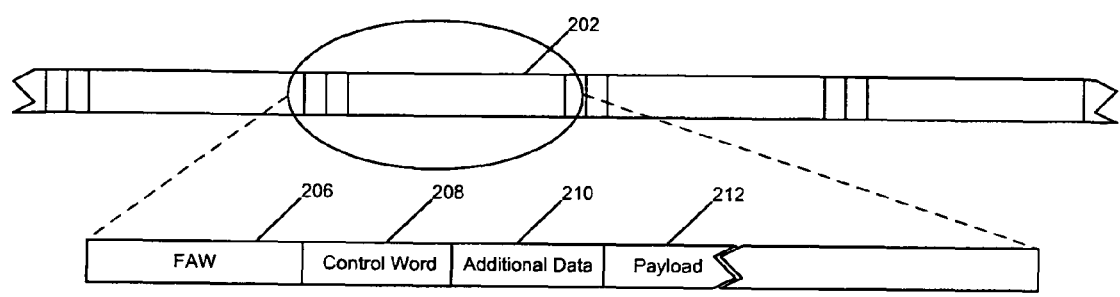
FIG. 2 is a general diagram depicting an illustrative input data stream.

Referring to FIG. 2, an illustrative input data stream, such as the input data stream 102 illustrated in FIG. 1, is shown. The input data stream includes an illustrated frame portion 202 that includes data included in a frame alignment word (FAW) field 206, a control word field 208, an additional data field 210, and a payload data field 212. In addition, it should be noted that the input data stream includes a plurality of sequential frames such as the illustrated frame 202.

Figure 3:
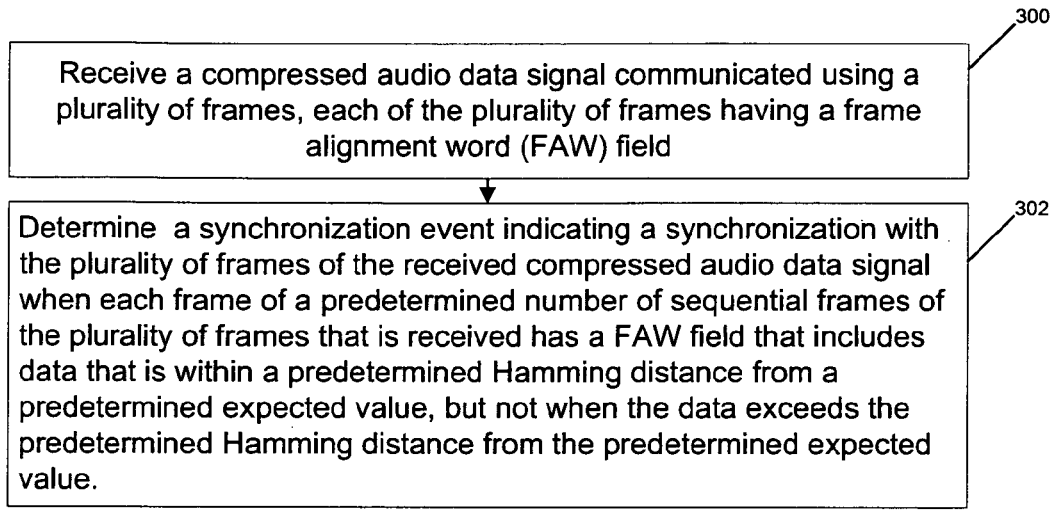
FIG. 3 is a flow chart depicting an illustrative method of processing compressed audio data.

Referring to FIG. 3, an illustrative method of processing compressed audio data is shown. In a particular embodiment, the method includes receiving a compressed audio data signal that is communicated using a plurality of frames. Each of the plurality of frames has a frame alignment word (FAW) field, as shown at 300. The method further includes determining a synchronization event that indicates synchronization with the plurality of frames of the received compressed audio data signal. The synchronization event occurs when each of the predetermined number of sequential frames of the plurality of frames is received and has a FAW field that includes data within a predetermined Hamming distance from a predetermined expected value. It should be noted that the synchronization event does not occur when the data exceeds the predetermined Hamming distance from the predetermined expected value, as illustrated at 302. In a particular illustrative example, the predetermined Hamming distance is two and the predetermined number of sequential frames is ten.

In another particular illustrative example, the tenth frame of the plurality of frames that is received before determining the synchronization event has a FAW field that includes data that is a Hamming distance of zero from the predetermined expected value. In another illustrative example, the ninth of the plurality of frames received before determining the synchronization event has a FAW field that includes data with a Hamming distance of one from the predetermined expected value. In another particular example, each of the plurality of frames further includes a control word field, and at least eight sequential frames of the nine frames received prior to determining the synchronization event has a control word field that includes data that matches a first data pattern. In a particular example, the control word field includes a C1 bit, a C3 bit, and a C4 bit and the first data pattern includes data included in the control word field that corresponds to the C1 bit, the C3 bit, and the C4 bit of the eighth frame received prior to determining the synchronization event.

In another particular illustrative embodiment, the synchronization event includes a NICAM sound output. In another embodiment, the synchronization event includes setting a register bit value. In one non-limiting example, the register bit value may be stored in a register, such as the control world register 114 as shown in FIG. 1. In an alternative non-limiting example, the register bit value may be stored in a shift register for additional data such as the register 116 shown in FIG. 1. In another particular illustrative embodiment, a last frame received prior to determining the synchronization event has a payload data field that includes data and the synchronization event includes sending the data from the payroll data field of the last frame to a descrambler, such as the descrambler 112 shown in FIG. 1.

Figure 4:
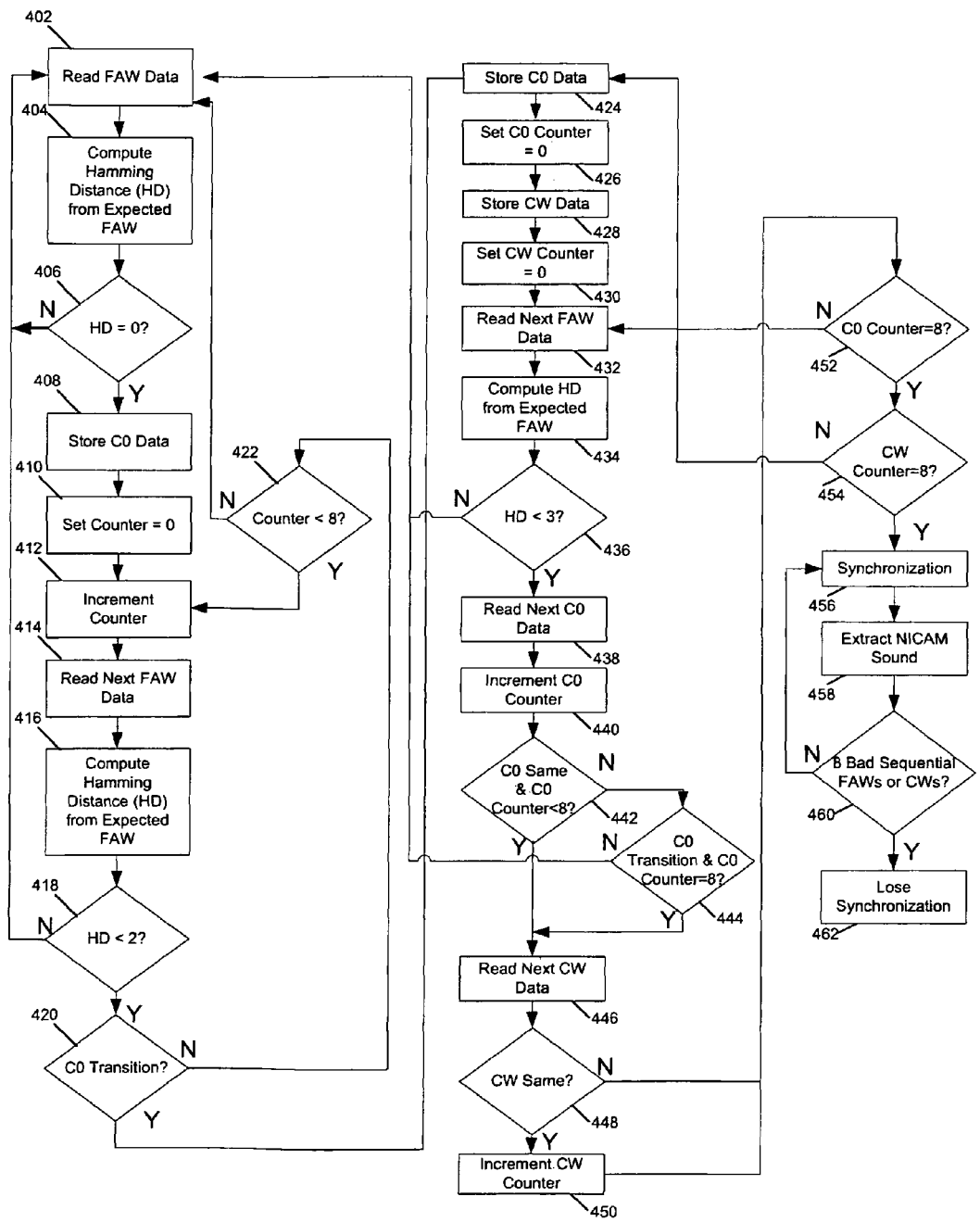
FIG. 4 is a flow chart depicting a detailed illustrative method of processing compressed audio data.

Referring to FIG. 4, a further detailed embodiment of a method of processing compressed audio data is shown. The illustrated method includes reading FAW data at 402, computing a Hamming distance from an expected FAW value at 404, and comparing the Hamming distance to zero at decision step 406. Where the Hamming distance is determined to be equal to zero, processing continues at 408 where the C0 data is stored, a counter is set at 410, the counter is incremented at 412, a next FAW data field corresponding to the next frame is read at 414, and a Hamming distance is computed with respect to the expected FAW as shown at 416. The second Hamming distance as compared to the expected FAW is then compared to a threshold value such as the value of two as shown at decision step 418. Where the Hamming distance as compared to the expected value is less than two, the processing continues to decision step 420 where a C0 bit transition event is evaluated.

When the C0 transition event at 420 is positive, processing continues to step 424 where the C0 data is stored, a C0 counter is set to zero at 426, the control word (CW) data is stored at 428, and a control word counter is stored at 430. Data from the next FAW field is read at 432 and the Hamming distance from the expected FAW is computed at 434. The Hamming distance is compared at decision step 436 to a second threshold Hamming distance such as the value of three as shown in FIG. 4.

Where the Hamming distance is less than the second threshold, processing continues with reading the next C0 data at 438 and incrementing the C0 counter at 440. Where the C0 data is the same as the C0 data stored at 424 and the C0 counter is less than a first C0 counter threshold value, such as the value of 8 as depicted in FIG. 4, as determined at decision step 442, processing continues with reading the next control word data at 446. Otherwise, where a C0 transition is detected and the C0 counter equals the first C0 counter threshold value, as determined at decision step 444, processing continues at 446.

Data from a next control word field is read at 446. Processing then continues to decision step 448, where the control word is compared to a data pattern of the stored control word data to determine if it is the same. If the control word data matches the data pattern of the stored control word, such as matching values of the C1 bit, C3 bit, and C4 bit, then processing continues to 450, where the control word counter is incremented, and decision step 452. Where the control word data does not match the data pattern of the stored control word at 448, processing continues to decision step 452 without incrementing the control word counter.

Continuing at decision step 452, the C0 counter value is compared to a second C0 counter threshold value, such as the value of eight as depicted in FIG. 4. Where the C0 counter value equals the second C0 counter threshold value, processing continues at decision step 454 where the control word counter is compared with a control word counter threshold value, such as the value of eight as depicted in FIG. 4. Where the control word counter value matches the control word counter threshold value, a synchronization event indicating synchronization is determined at 456. Once synchronization is determined, the method continues with extracting and outputting NICAM sound at 458 and thereafter performing a decision loop at decision step 460.

At step 460, the method looks for eight sequential bad frame alignment words or control words and loses synchronization upon detecting such an event, as shown in 462. As a non-limiting illustrative example, a bad FAW at decision 460 may be determined as having a Hamming distance of greater than one from a predetermined expected FAW. As another illustrative non-limiting example, a bad control word at decision 460 may be determined as not matching a predetermined data pattern. Otherwise, synchronization is continued at 456 and processing continues at 458. If synchronization is lost at step 462, processing may start over at step 402 to reacquire synchronization.

Referring to decision logic 418, where the Hamming distance is not less than two, then the Hamming distance error is detected in processing and returns back to 402 where a new FAW data field is read. Similarly, where the Hamming distance is not equal to zero as shown at decision step 406, processing returns to reading a FAW data field at 402. Referring to decision step 420, where a C0 transition is not detected, processing proceeds to decision step 422 where a counter is evaluated with respect to a threshold, such as the threshold of eight as shown at 422. Where the counter is greater than or equal to eight, processing returns to reading additional FAW data at 402, but where the counter is less than eight the counter is incremented and processing continues at 412. Referring to decision step 436, where a Hamming distance exceeds the second Hamming distance threshold, such as by having a value greater than or equal to three as depicted in FIG. 4, a FAW error has been detected and processing returns to 402 where new FAW data is read. Similarly, where neither a C0 transition is observed when the C0 counter value is less than the C0 counter threshold at 442 nor a C0 transition is observed when the C0 counter value equals the C0 counter threshold at 444, a C0 error has been detected and processing returns at 402 where new FAW data is read.

Referring to decision step 452, where the C0 counter value is not equal to the second C0 counter threshold, processing continues with reading the next FAW data at 432. Where the control word counter value does not equal the control word threshold at decision step 454, processing continues at step 424, where the C0 data is stored.

Thus, when a frame alignment word is detected in an input data sequence that matches a predetermined expected value, such as, for an illustrative example, a NICAM frame alignment word value having a bit sequence of 01001110, successive frames are examined to determine if a true frame sequence has been located by comparison to an expected behavior of a frame sequence. In particular, the data included in the FAW fields are examined to ensure a first allowable error threshold is not exceeded until a C0 bit transition is detected within eight frames. Once the C0 bit transition is detected at 420, successive frames of the input signal are examined to ensure that a second allowable error threshold, more relaxed than the first, is not exceeded by the FAW data, the control word data matches an expected data pattern, and that another C0 bit transition occurs eight frames later.

When the proper C0 transition is detected and the control word evaluation of step 454 is positive, synchronization has occurred and sound output begins. Synchronization may continue even in the presence of a data errors in accordance with the tests conducted at decision step 460. Thus, the method described with respect to FIG. 4 beneficially provides an enhanced synchronization function and a robust synchronization lock operation in the presence of noise as long as the noise does not exceed predetermined thresholds.

Figure 5:
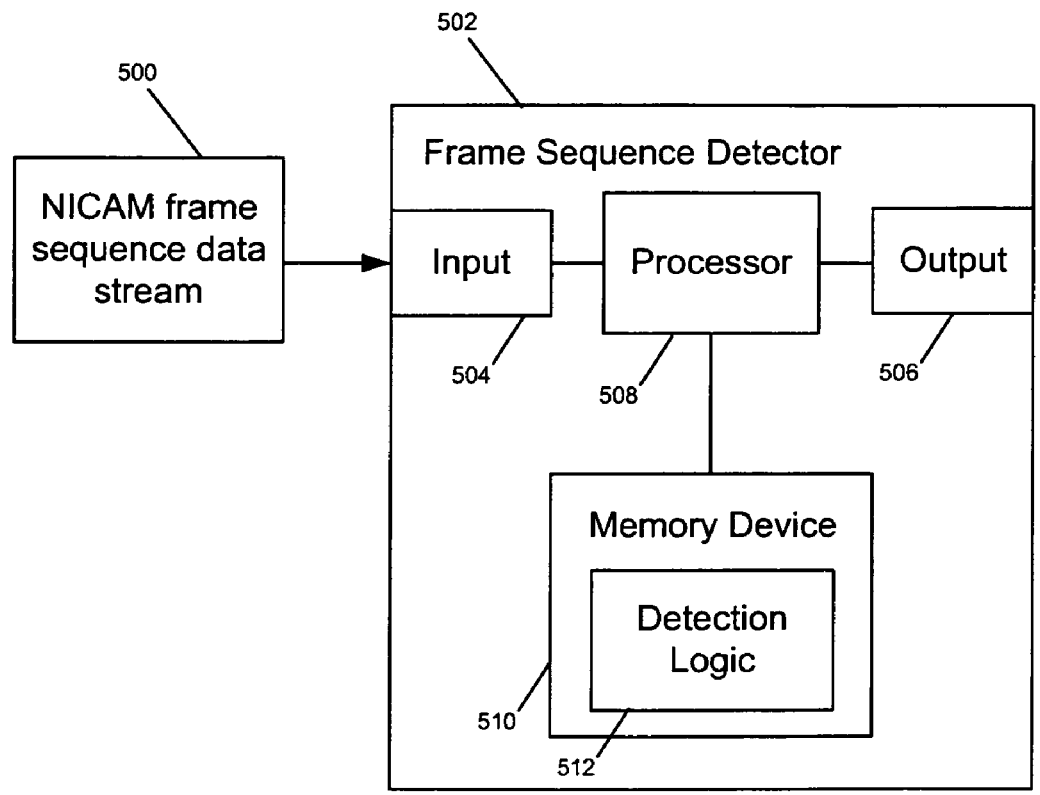
FIG. 5 is a block diagram depicting an exemplary frame sequence detector.

Referring to FIG. 5, a frame sequence synchronization system is shown. The frame sequence synchronization system includes a NICAM frame sequence data stream 500 input to a frame sequence synchronization detector 502. The frame sequence detector 502 includes a data input 504, a processor 508, and a data output 506. The frame sequence detector 502 also includes a memory device 510 that includes detection logic 512. The detection logic 512 may include computer readable and executable instructions that may be executed by the processor 508 to perform some or all of the various method steps as described with respect to FIGS. 3 and 4. Thus, the frame sequence detector 502 includes processing and memory hardware that performs methods and functions as described herein. The processed data is then provided to the output 506 and the synchronized data upon detection of the synchronization event may then be provided at such output 506.

Figures 6, 7:
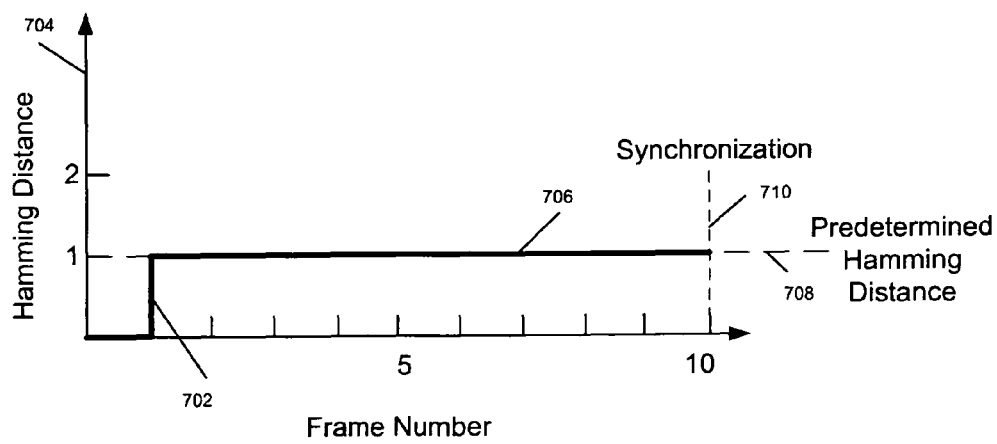
FIG. 6 is an illustration of an exemplary input data stream.
FIG. 7 is a graphical representation of the input data stream of FIG. 6.

Referring to FIG. 6, an example of an input data stream of detected data and comparison with respect to Hamming distance of such data to an expected FAW is shown. The example data stream includes expected FAW data 602, detected data 604, and the Hamming distance indication 606. As shown, a first detected FAW word is received that has a Hamming distance of 0 from the expected FAW word. In this case the expected FAW word exactly matches the detected data 604. In addition, the subsequent data fields have an expected FAW value that does not exactly match the detected data but substantially matches such data as indicated by Hamming distance having a value of 1. Because Hamming distance indicates how many bits are different between two data values, a Hamming distance of 1 indicates only 1 bit does not match when the two values are compared. Thus, in this situation, even though the nine frames following the original frame are not exact matches, synchronization can be detected due to the evaluation of the Hamming distance as shown herein.

Referring to FIG. 7, a graphical representation of the Hamming distance of the exemplary input data stream as shown with respect to FIG. 6 is illustrated. The graphical representation includes at the y axis a Hamming distance indicator and at the x axis a frame number for the received frames. The graphical representation also identifies the Hamming distance value via graphical representation 706. As shown, the Hamming distance has a value of 0 for the first frame then a transition occurs at 712 that shows a transition to a Hamming distance of 1 for the following 9 sequential frames. In this case a predetermined Hamming distance threshold 708 is also shown to have a Hamming distance threshold value of 1. The graphical representation also shows that a synchronization event is detected at 710 when a number of sequential FAWs, illustrated in FIG. 7 as ten FAWs, are detected in the exemplary input data stream as depicted by graphical representation 706 as having a Hamming distance value less than or equal to the predetermined Hamming distance threshold 708.

Figures 8, 9:
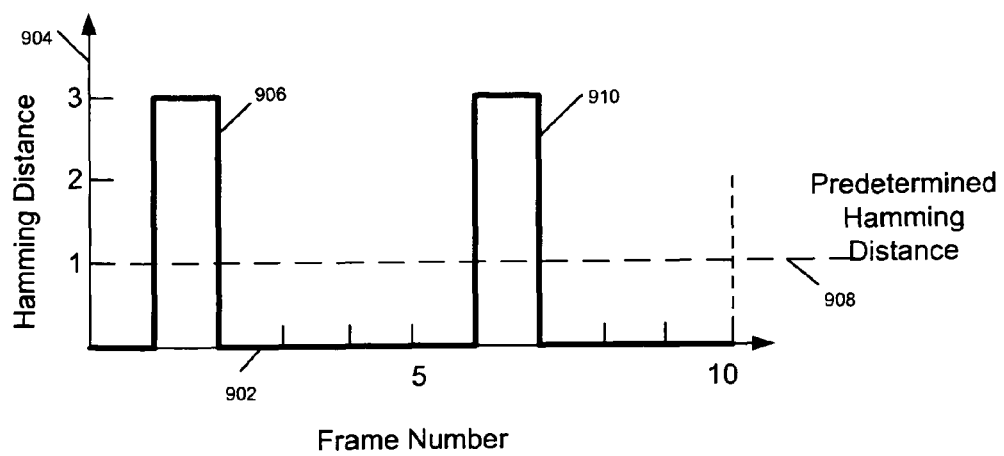
FIG. 8 is an illustration of another exemplary input data stream.
FIG. 9 is a graphical representation of the input data stream of FIG. 8.

Referring to FIG. 8, a second example of a received input data stream is shown. The second input data stream is indicated as having a plurality of frames including an expected FAW data 802, detected data 804, and the Hamming distance 806. In this example, while the first frame has a Hamming distance of 0, the second frame has a Hamming distance of 3. A Hamming distance of three is above a predetermined threshold and would therefore require a restart of the synchronization attempt. Also, as shown, a second Hamming distance frame of 3 occurs at the $7^{th}$ frame, again losing synchronization with respect to the method of processing the input data stream.

Referring to FIG. 9, the second example data stream is shown in graphical form and the first Hamming distance exception that is above the Hamming distance threshold, shown at 908, is illustrated at 906. The second Hamming distance event above the threshold 908 is shown at 910. It should be noted that while the disclosed method and system in the second example would not lock on for a synchronization event due to the two Hamming distance exception values 906 and 910, other conventional systems may determine a synchronization event because eight of the ten frames are an exact match. Thus, the disclosed system and method may in certain applications and in certain circumstances provide for enhanced synchronization logic to avoid a false-positive synchronization event as shown in the second example.

Figures 10, 11:
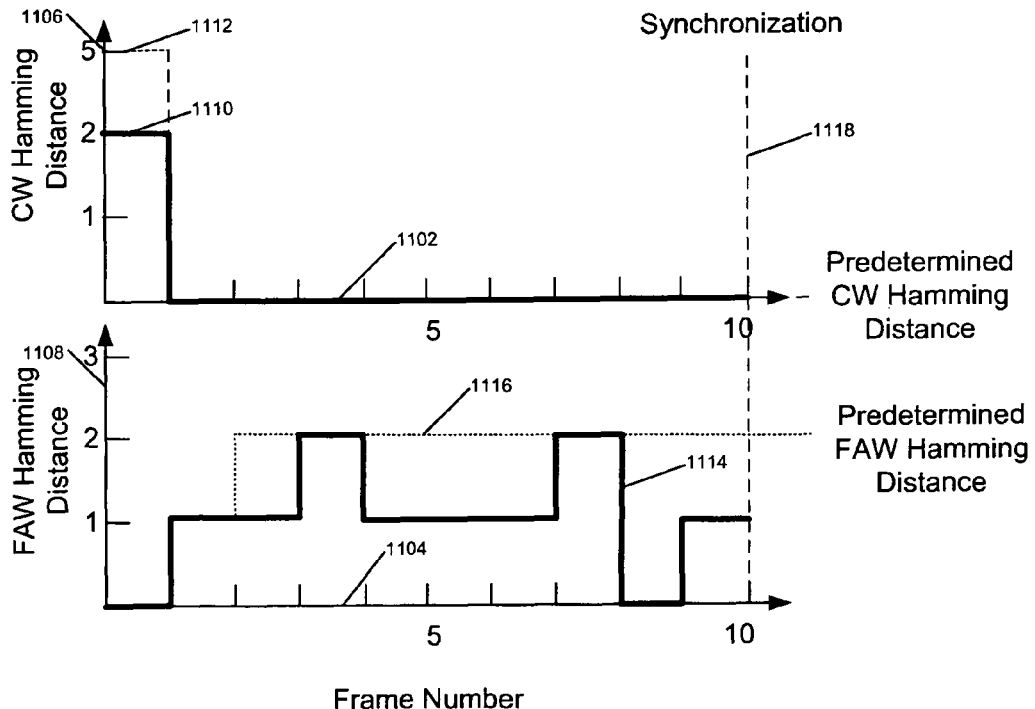
FIG. 10 is an illustration of another exemplary input data stream.
FIG. 11 is a graphical representation of the input data stream of FIG. 10.

Referring to FIG. 10 and FIG. 11, another illustrated embodiment of an input data stream evaluated with respect to the method and system described herein is shown. FIG. 10 illustrates an input stream of ten representative data words received and is shown as having an expected Control Word data pattern 1002, detected data from the input data stream 1004, and the Hamming distance indication 1006. The expected control word data pattern is represented as values of 5 bits designated C0, C1, C2, C3, and C4 as shown at 1008.

Referring to FIG. 11, a graphical display illustrates the Control Word Hamming distance 1106 represented against the predetermined control word Hamming distance graphically depicted as 1112, and the number of frames 1102, and the FAW Hamming distance 1108 represented against the number of frames 1104 with respect to the predetermined FAW Hamming distance 1116. As shown in FIG. 11, the predetermined control word Hamming distance indicated by dashed line 1112 starts at a value of 5 for the first frame received and for the following nine sequential frames drops to a value of zero, thus requiring an exact match of the detected Control Word data to the expected data pattern for the second through the tenth consecutive frames. At the same time, the predetermined frame alignment word Hamming distance indicated by dotted line 1116 is shown as requiring a zero value for the first frame received, followed by a value of one or less for the second frame received, followed by a value of 2 or less for the remaining eight frames received. Thus, the FAW Hamming distance display and the Control Word Hamming distance display together demonstrate a sequence of ten frames received where a first frame has an exact FAW match followed by a series of frames with close or near-miss FAWs, and where the first frame has two control word bit errors but each sequential frame has no control word bit errors. Although errors are demonstrated in the signal, the errors fall within the predetermined thresholds 1112 and 1116, and thus the signal is sufficient for synchronization as illustrated at 1118.

In the exemplary input data stream illustrated in FIG. 10, the expected control word data pattern 1002 indicates C0 and C2 values of 'X,' representing that the value is inconsequential, whereas the C1, C3, and C4 bits are designated by an exemplary value of zero or one. Therefore, the data pattern is characterized by the C1, C3, and C4 values. In one non-limiting illustrative embodiment, the expected control word data pattern may be a predetermined control word data pattern representing a specific anticipated NICAM input signal. However, in an alternative non-limiting illustrative embodiment, the expected control word data pattern may be derived from a stored value of a control word from a previously received frame at the data input.

While specific systems and components of systems have been shown, it should be understood that many alternatives are available for such systems and components. In a particular illustrative embodiment, for example, the frame sequence detector may include various logic to perform functions and methods of operation as described. So, while a computer readable memory and logical device has been shown, it should be understood that other hardware and/or other software mechanisms may be provided to perform similar functions or methods of operation.

Also, while error characteristics such as specific Hamming distance values have been provided, it should be understood that alternative error characteristics or Hamming distance values may also be used. In a particular embodiment, the input data stream may be a NICAM sequence. However, the systems and methods described herein may be used to synchronize to a non-NICAM frame sequence. Also, while a synchronization event may indicate detection of a particular input data stream, a synchronization event may indicate a loss of synchronization to a plurality of frames of a data stream.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of processing compressed audio data, the method comprising:
   receiving a compressed audio data signal communicated in a plurality of frames, each of the plurality of frames having a frame alignment word (FAW) field and a control word;
   incrementing a control word counter value when the control word is received; and
   determining a synchronization event indicating a synchronization with the plurality of frames of the received compressed audio data signal when each frame of a predetermined number of sequential frames of the plurality of frames that is received has a FAW field that includes data that is within a predetermined Hamming distance from a predetermined expected value and when the control word counter value satisfies a control word counter threshold value, but not when the data exceeds the predetermined Hamming distance from the predetermined expected value.

2. The method of claim 1, wherein the predetermined Hamming distance is two, and wherein the predetermined number of sequential frames is ten.

3. The method of claim 2, wherein the tenth frame of the plurality of frames received before determining the synchronization event has a FAW field that includes data that has a Hamming distance of zero from the predetermined expected value.

4. The method of claim 3, wherein the ninth frame of the plurality of frames received before determining the synchronization event has a FAW field that includes data that has a Hamming distance of one from the predetermined expected value.

5. The method of claim 4, wherein at least eight sequential frames of the nine frames received prior to determining the synchronization event have a control word that includes data that matches a first data pattern.

6. The method of claim 5, wherein each frame of the plurality of frames is a NICAM frame, wherein the control word comprises a c1 bit, a c3 bit and a c4 bit, and wherein the first data pattern comprises the data included in the control word corresponding to the c1 bit, the c3 bit, and the c4 bit of the control word of the eighth frame received prior to the determining of the synchronization event.

7. The method of claim 1, wherein the synchronization event comprises a NICAM sound output.

8. The method of claim 1, wherein the synchronization event comprises setting a register bit value.

9. The method of claim 1, wherein a last frame received prior to determining the synchronization event has a payload data field that includes data, and wherein the synchronization event comprises sending the data from the payload data field of the last frame to a descrambler.

10. A non-transitory computer readable memory comprising instructions executable by a processor to implement:
    a shift register to receive an input data stream comprising a plurality of frames, each of the plurality of frames having a frame alignment word (FAW) field and a control word;
    a counter that is incremented when each control word is detected; and
    detection logic coupled to the shift register to synchronize and maintain synchronization to the plurality of frames of the input data stream when a first frame of the plurality of frames that is received has a first FAW field that includes data that matches a predetermined expected FAW and when each frame received after the first frame of the plurality of frames has a FAW field that includes data that does not exactly match the predetermined expected FAW and wherein each frame received after the first frame of the plurality of frames has a FAW field that includes data that is a Hamming distance of not more than two from the predetermined expected FAW and when the counter satisfies a control word threshold.

11. The non-transitory computer readable memory of claim 10, wherein the detection logic releases synchronization when a predetermined number of sequential frames are received, wherein each of the predetermined number of sequential frames has a control word that includes data that does not match a first data pattern.

12. The non-transitory computer readable memory of claim 11, wherein each frame of the plurality of frames is a near instantaneous companded audio multiplex (NICAM) frame.

13. The non-transitory computer readable memory of claim 12, wherein the control word includes a c1, c3 and c4 bit, and wherein the first data pattern comprises logical values corresponding to the c1, c3 and c4 bits.

14. A frame sequence detector comprising:
    an input to receive an input data stream comprising a plurality of frames, each of the plurality of frames having a control word field and frame alignment word field; and
    a processor to determine a synchronization event in response to an error characteristic of the data included in the control word field of a predetermined number of sequentially received frames, and in response to a control word count satisfying a threshold.

15. The detector of claim 14, wherein the synchronization event indicates synchronizing to the plurality of frames of the input data stream.

16. The detector of claim 15, wherein the error characteristic comprises at least three bits of the data included in the control word field of each of the predetermined number of sequentially received frames matching an expected value.

17. The detector of claim 16, wherein the predetermined number of sequentially received frames is eight.

18. The detector of claim 14, wherein the input data stream comprises digital audio data.

19. The detector of claim 18, wherein the input data stream is a near instantaneous companded audio multiplex (NICAM) frame sequence.

20. The detector of claim 14, wherein the synchronization event indicates a loss of synchronization to the plurality of frames.

21. The detector of claim 20, wherein the error characteristic comprises at least one bit of a predetermined selection of bits of the data included in the control word field of each of the sequentially received frames not matching an expected value.

22. The detector of claim 21, wherein the predetermined number of sequentially received frames is eight.

23. The detector of claim 22, wherein the input data stream is a near instantaneous companded audio multiplex (NICAM) frame sequence.

24. The detector of claim 23, wherein the predetermined selection of bits is the c1, c3 and c4 bit of the control word field of each NICAM frame.

* * * * *